(12) United States Patent
Fukata et al.

(10) Patent No.: US 10,594,900 B2
(45) Date of Patent: Mar. 17, 2020

(54) IMAGE FORMING APPARATUS

(71) Applicant: KYOCERA Document Solutions Inc., Osaka (JP)

(72) Inventors: Takuya Fukata, Osaka (JP); Koji Minakuchi, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 15/904,477

(22) Filed: Feb. 26, 2018

(65) Prior Publication Data

US 2018/0249045 A1 Aug. 30, 2018

(30) Foreign Application Priority Data

Feb. 27, 2017 (JP) ................. 2017-034862

(51) Int. Cl.
| | | |
|---|---|---|
| *H04N 1/50* | (2006.01) | |
| *G09B 3/02* | (2006.01) | |
| *H04N 1/00* | (2006.01) | |
| *H04N 1/64* | (2006.01) | |
| *G06K 9/00* | (2006.01) | |
| *G06K 9/32* | (2006.01) | |
| *H04N 1/387* | (2006.01) | |

(Continued)

(52) U.S. Cl.
CPC ............ *H04N 1/50* (2013.01); *G06K 9/00422* (2013.01); *G06K 9/00449* (2013.01); *G06K 9/3216* (2013.01); *G06T 11/001* (2013.01); *G09B 3/02* (2013.01); *H04N 1/00724* (2013.01); *H04N 1/387* (2013.01); *H04N 1/626* (2013.01); *H04N 1/64* (2013.01)

(58) Field of Classification Search
CPC ...... H04N 1/50; H04N 1/00724; H04N 1/387; H04N 1/626; H04N 1/64; G06K 9/00422; G06K 9/00449; G06K 9/3216; G06T 11/001; G09B 3/02
See application file for complete search history.

(56) References Cited

U.S. PATENT DOCUMENTS 4,177,578 A * 12/1979 Yamamoto ............... G09B 1/00
434/157
7,604,161 B2   10/2009 Tamune
(Continued)

FOREIGN PATENT DOCUMENTS

| JP | 2006-121205 A | 5/2006 |
|---|---|---|
| JP | 2007-004523 A | 1/2007 |
| JP | 2017-109356 A | 6/2017 |

OTHER PUBLICATIONS

An Office Action mailed by the Japanese Patent Office dated Sep. 24, 2019, which corresponds to Japanese Patent Application No. 2017-034862 and is related to U.S. Appl. No. 15/904,477.

*Primary Examiner* — Iriana Cruz
(74) *Attorney, Agent, or Firm* — Studebaker & Brackett PC

(57) ABSTRACT

An image forming apparatus includes a reading section and an image forming section. The reading section reads a plurality of images formed on a document. The image forming section forms the images on a plurality of sheets. The images include a first image having a first color, and one or more second images having a second color differing from the first color. The sheets include a first sheet and a second sheet differing from the first sheet. The image forming section forms the first image on the first sheet and the second images on the second sheet.

7 Claims, 8 Drawing Sheets

(51) Int. Cl.
*H04N 1/62* (2006.01)
*G06T 11/00* (2006.01)

(56) References Cited

U.S. PATENT DOCUMENTS

| | | | | |
|---|---|---|---|---|
| 2006/0289625 A1* | 12/2006 | Tamune | ............. | G09B 1/00 |
| | | | | 235/375 |
| 2014/0118757 A1* | 5/2014 | Rimai | ............. | G06F 3/128 |
| | | | | 358/1.9 |
| 2015/0087384 A1* | 3/2015 | Brewer | ............. | G07F 17/34 |
| | | | | 463/20 |
| 2016/0127612 A1* | 5/2016 | Satomi | ............. | H04N 1/4493 |
| | | | | 358/1.18 |

\* cited by examiner

IMAGE FORMING APPARATUS

INCORPORATION BY REFERENCE

The present application claims priority under 35 U.S.C. § 119 to Japanese Patent Application No. 2017-034862, filed on Feb. 27, 2017. The contents of this application are incorporated herein by reference in their entirety.

BACKGROUND

The present disclosure relates to an image forming apparatus.

In an image forming apparatus, a document image is read from a document and a specific area that has a specific color is designated within the document image. The image forming apparatus converts an image of the specific area into a black or white image, and forms the document image on a sheet. Accordingly, by marking the document with a marker in a specific color, for example, an image can be obtained from the document image in which the marked characters are covered in black. Thus, it is possible to create a fill-in-the-blank worksheet from questions and answers of educational material for memorization.

SUMMARY

An image forming apparatus according to the present disclosure includes a reading section and an image forming section. The reading section reads a plurality of images formed on a document. The image forming section forms the images on a plurality of sheets. The images include a first image having a first color, and one or more second images having a second color differing from the first color. The sheets include a first sheet and a second sheet differing from the first sheet. The image forming section forms the first image on the first sheet and the second images on the second sheet.

DETAILED DESCRIPTION

Figure 1:
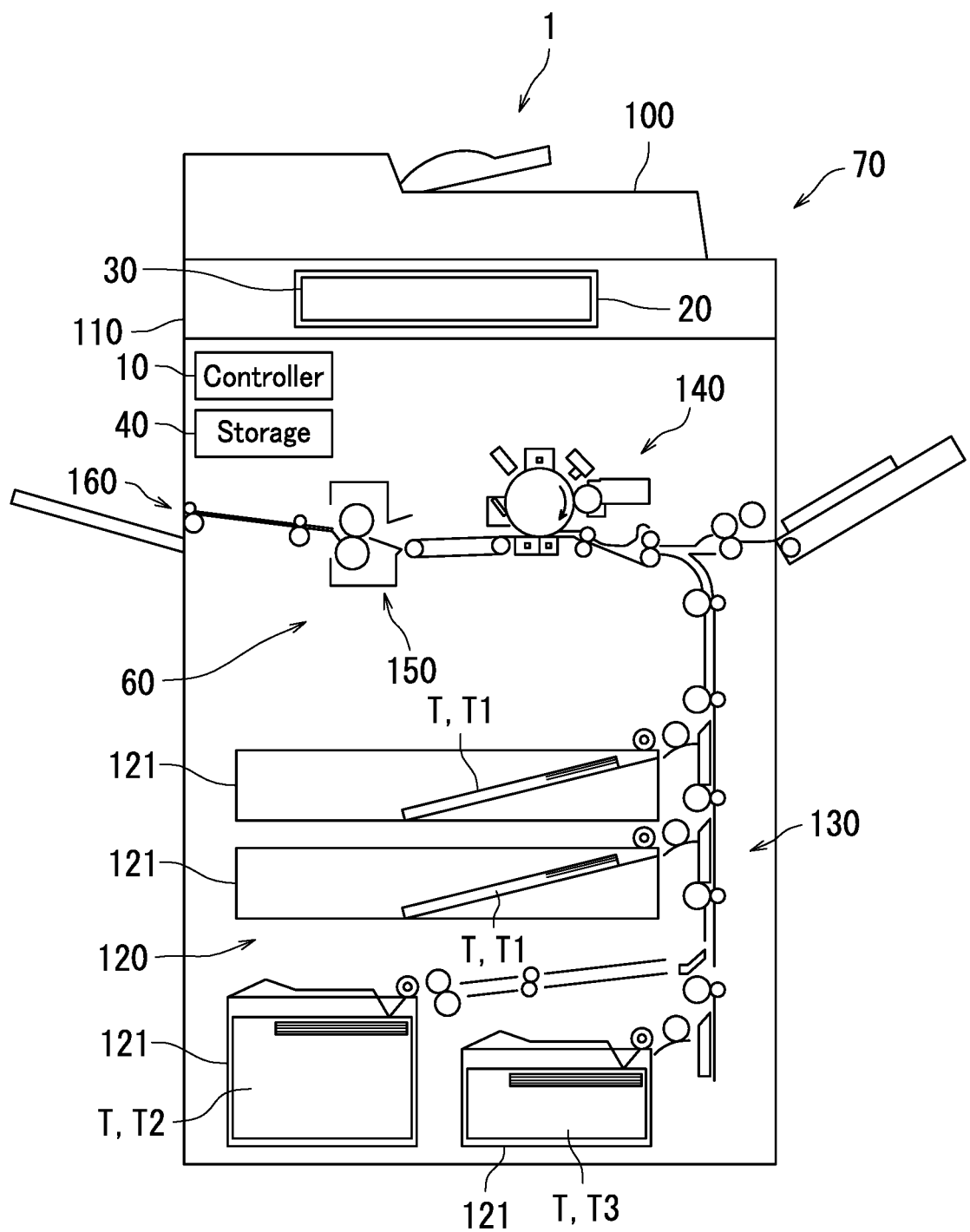
FIG. 1 is a diagram illustrating an image forming apparatus according to a first embodiment of the present disclosure.

An embodiment of the present disclosure will be described as follows with reference to FIGS. 1 to 8. Note that within the drawings, same or equivalent elements will be referred to with the same reference numerals and descriptions thereof will not be repeated.

A general configuration of an image forming apparatus according to an embodiment of the present disclosure will be described with reference to FIG. 1. FIG. 1 illustrates an image forming apparatus 1 according to a first embodiment of the present disclosure. The image forming apparatus 1 is a multifunction peripheral, for example.

The image forming apparatus 1 as illustrated in FIG. 1 creates educational material for memorization. The educational material for memorization includes a fill-in-the-blank worksheet and corresponding answer keys. The image forming apparatus 1 includes a controller 10, a display section 20, a detector 30, storage 40, an image forming mechanism 60, and a document reading mechanism 70. The controller 10 includes a central processing unit and executes a creation process of the educational material for memorization. The creation process is for creating the fill-in-the-blank worksheet and corresponding answer keys. The controller 10 also controls the display section 20, the detector 30, the storage 40, the image forming mechanism 60, and the document reading mechanism 70.

The display section 20 displays images. The detector 30 is a touch panel for example, and is located over a display surface of the display section 20. The detector 30 detects a touch operation on the images displayed on the display section 20. The storage 40 stores various information.

The document reading mechanism 70 includes a document conveyance section 100 and a reading section 110. The document conveyance section 100 conveys a document to the reading section 110. The reading section 110 reads a plurality of images formed on the document. The storage 40 stores data indicating colors corresponding to pixels of the images as the various information.

The image forming mechanism 60 includes a housing section 120, a conveyance section 130, an image forming section 140, a fixing section 150, and an ejection section 160.

The housing section 120 includes a plurality of cassettes 121 which house sheets T. The cassettes 121 also support the sheets T. The sheets T include plain paper T1, thin paper T2, and overhead projector (OHP) transparency T3.

The conveyance section 130 conveys the sheets T from the housing section 120 to the ejection section 160 via the image forming section 140 and the fixing section 150.

The image forming section 140 forms the images included in the document on the sheets T. The images include a first image and a second image. The sheets T include a first sheet and a second sheet. The first image has a first color. The second image has a second color. The second color differs from the first color. The second sheet differs from the first sheet. The image forming section 140 forms the first image on the first sheet and the second image on the second sheet. The fixing section 150 applies heat and pressure to a sheet T on which an image is formed, thereby fixing the image to the sheet T. The ejection section 160 ejects the sheet T on which the image is formed.

Figure 2:
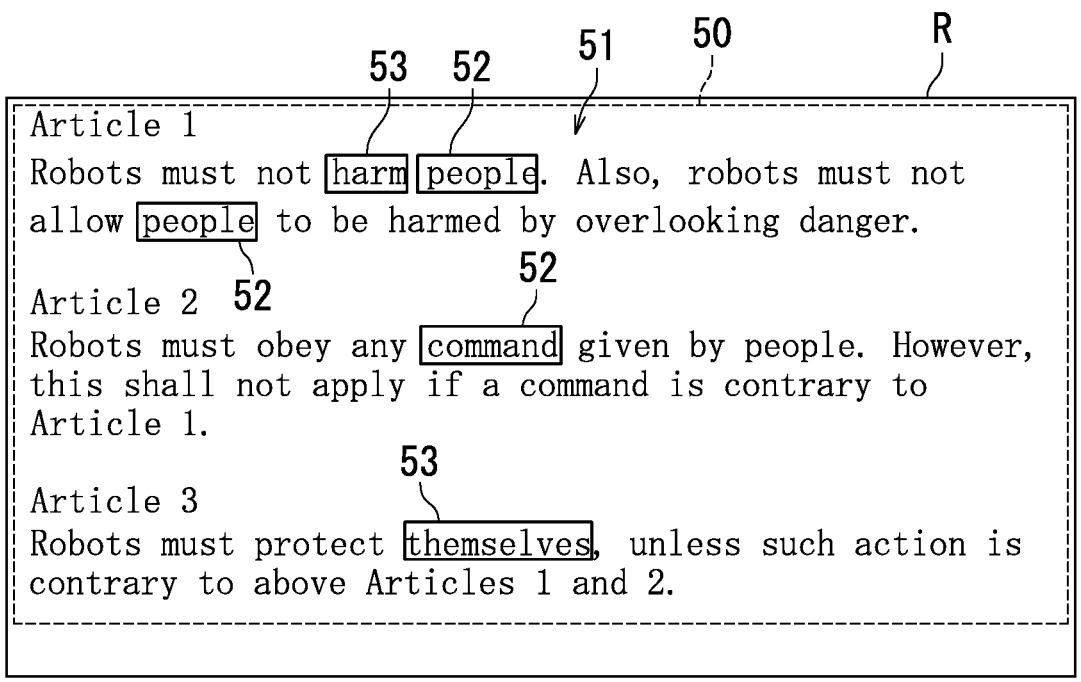
FIG. 2 is a diagram illustrating a document.

Next, operation of the controller 10 will be described with reference to FIGS. 2 and 3. FIG. 2 illustrates a document R.

As illustrated in FIG. 2, the document R includes a character image 50 that includes a plurality of "characters". The characters include letters and narrowly defined characters example, the exclamation mark "!", the percent sign "%", and the number sign "#").

The character image 50 includes a plurality of images (a first image 51, second images 52, and third images 53). The first image 51 has the first color. The second images 52 have the second color. The third images 53 have a third color. The first image 51, the second images 52, and the third images 53 each include one or characters.

The third color differs from the first color and the second color. For example, the first color is black, the second color is red, and the third color is blue.

Figure 3:
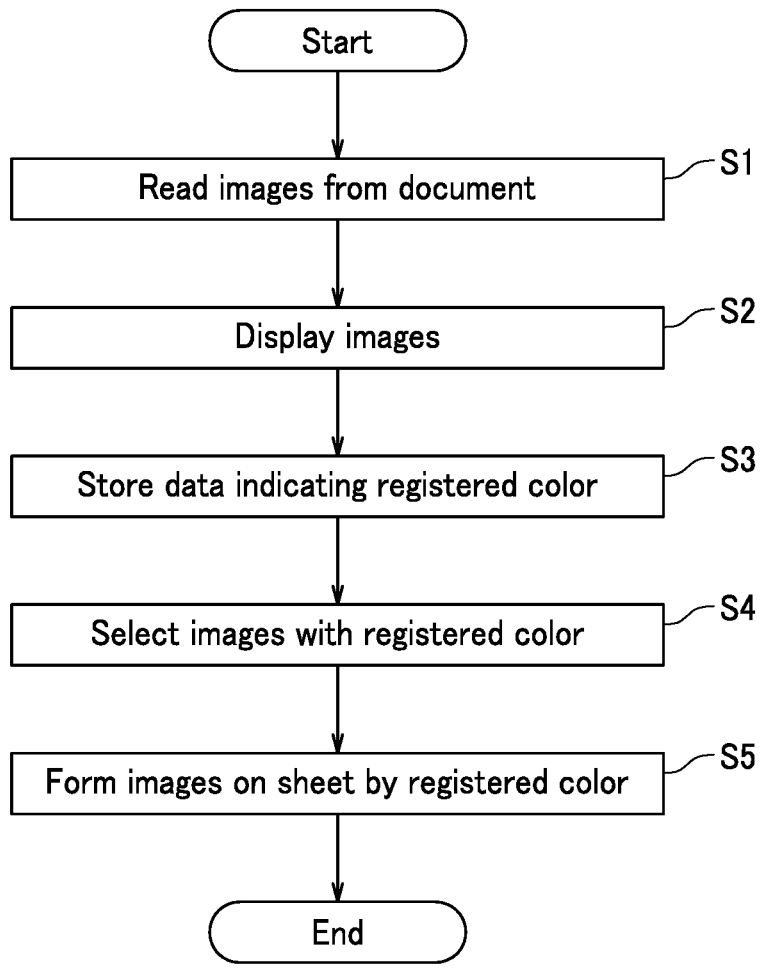
FIG. 3 is a flowchart illustrating a creation process of educational material for memorization.

FIG. 3 is a flowchart illustrating the creation process of the educational material for memorization. In Step S1 as illustrated in FIG. 3, the controller 10 directs the document reading mechanism 70 to read the character image 50 formed on the document R.

In Step S2, the controller 10 directs the display section 20 to display the character image 50 read from the document R.

In Step S3, the controller 10 directs the storage 40 to store the data indicating the second color. The storage 40 stores the data indicating the second color as data indicating a registered color. The registered color is then stored in the storage 40 as a color of images exhibiting answers for the fill-in-the-blank worksheet. The controller 10 also directs the storage 40 to store the data indicating the third color. The storage 40 then stores the data indicating the third color as data indicating a registered color.

Specifically, when a touch operation (first touch operation) is detected on a portion of the character image 50, the controller 10 designates the color of the portion of the character image 50 on which the touch operation has taken place. The controller 10 then directs the storage 40 to store data indicating the designated color. More specifically, when a touch operation (second touch operation) is detected on a character within the character image 50, the controller 10 designates the color of the character on which the touch operation has taken place. The controller 10 then directs the storage 40 to store data indicating the designated color.

For example, when a touch operation takes place on a character within a second image 52, the storage 40 stores data indicating the second color as data indicating a registered color. Also, when a touch operation takes place on a character within a third image 53, the storage 40 stores data indicating the third color as data indicating a registered color.

For example, the storage 40 stores red, green, and blue (RGB) data indicating the brightness of each of the three elemental colors (red (R), green (G), and blue (B)) as data indicating registered colors. In a case in which the RGB data indicates the brightness of each of the three elemental colors with 256 level values, red, when having the highest brightness for example, is indicated by RGB data (255, 0, 0). Green, when having the highest brightness, is indicated by RGB data (0, 255, 0). Blue, when having the highest brightness, is indicated by RGB data (0, 0, 255).

In Step S4, the controller 10 selects the second images 52 and the third images 53 from the character image 50 based on the data indicating the second color and the data indicating the third color. For example, when the second color is indicated by RGB data (210, 0, 0), the controller 10 selects images (second images) with RGB data from (190, 0, 0) to (230, 20, 20) as the second images 52 from the character image 50. Also, for example, when the third color is indicated by RGB data (0, 0, 210), the controller 10 selects images (third images) with RGB data from (0, 0, 190) to (20, 20, 230) as the third images 53 from the character image 50.

In Step S5, the controller 10 directs the image forming mechanism 60 to form the second images 52 on the second sheet (thin paper T2, for example). The second sheet on which the second images 52 are formed is used as an answer key for the fill-in-the-blank worksheet. The thin paper T2 is an example of a semi-transparent sheet T.

The controller 10 also directs the image forming mechanism 60 to form the third images 53 on the third sheet (OHP transparency T3, for example). The third sheet on which the third images 53 are formed is used as another answer key for the fill-in-the-blank worksheet. The OHP transparency T3 is an example of a transparent sheet T. Note that the third images 53 may be formed on the reverse side of the second sheet on which the second images 52 are formed.

The third sheet differs from the first sheet. The second sheet and the third sheet may be the same sheet or different sheets. The first sheet, the second sheet, and the third sheet may be sheets of differing varieties. The first sheet, the second sheet, and the third sheet may be sheets of the same variety when consisting of thin paper T2 or OHP transparency T3, for example.

The controller 10 also directs the image forming mechanism 60 to form the remaining portion (first image 51) of the character image 50 aside from the second images 52 and the third images 53 on the first sheet (plain paper T1, for example). The first sheet on which the remaining portion of the character image 50 aside from the second images 52 and the third images 53 is formed is used as the fill-in-the-blank worksheet.

The first sheet includes the entire portion of the character image 50 with no registered colors. For example, when the character image 50 further includes fourth images that have a fourth color (green, for example) which is not a registered color, the fourth images are formed together with the first image 51 on the first sheet. For another example, when the third color is not a registered color, the third images 53 are also formed together with the first image 51 on the first sheet.

According to the image forming apparatus 1 of the present embodiment as described above with reference to FIGS. 1 to 3, the first image 51 of the character image 50 is formed on the first sheet and the second images 52 are formed on the second sheet. Also, the third images 53 of the character image 50 are formed on the third sheet. Accordingly, the character image 50 is processed so as to erase the second images 52 from the character image 50. Thereby, a processed image can be formed on the first sheet, and the fill-in-the-blank worksheet can be created. Also, the character image 50 is processed so as to erase the third images 53 from the character image 50. Thereby, a processed image can be formed on the first sheet, and the fill-in-the-blank worksheet can be created. Also, the second images 52 and the third images 53 that serve as answers for the fill-in-the-blank worksheet are respectively formed on the second sheet and the third sheet. Accordingly, a user need not perform separate jobs to create the fill-in-the-blank worksheet and corresponding answer keys, and creating the answer keys for the fill-in-the-blank worksheet is simplified.

According to the image forming apparatus 1 of the present embodiment as described with reference to FIGS. 1 to 3, the second images 52 and the third images 53 are formed on the thin paper T2 or the OHP transparency T3. The thin paper T2 is semi-transparent, and the OHP transparency T3 is fully transparent. Accordingly, for example, when the second sheet and the third sheet are placed over the first sheet on which the first image 51 is formed, the user can easily see the first image 51. As a result, confirming the content learned using the fill-in-the-blank worksheet is simplified.

Note that when the density of the image to be formed on the first sheet (the first image 51, for example) is less than a predetermined density, the controller 10 can direct the image forming mechanism 60 to form the image on the first sheet at the predetermined density or more. Alternatively, the controller 10 can direct the image forming mechanism 60 to increase the density of the image to be formed on the first sheet at a predetermined rate (1.2 times, for example) more than the density of the original image. As a result, when either or both the second sheet and the third sheet are placed over the first sheet that is used as the fill-in-the-blank worksheet, the image formed on the first sheet may not become difficult to see.

Next, the creation process of the educational material for memorization will be described in further detail with reference to FIGS. 1 to 3 and 4 to 8.

Figure 4:
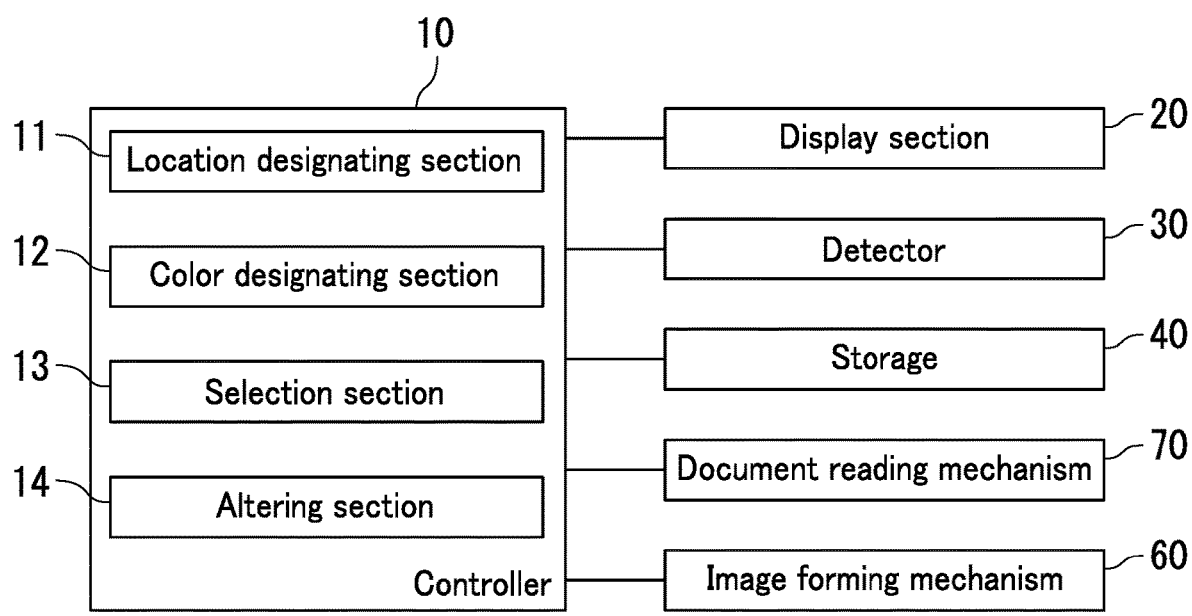
FIG. 4 is a diagram illustrating a control system of the image forming apparatus from FIG. 1.

FIG. 4 illustrates the controller 10. The controller 10 includes a location designating section 11, a color designating section 12, a selection section 13, and an altering section 14. The location designating section 11 designates locations of the second images 52 relative to the first image 51. The image forming section 140 forms marks on the first sheet so as to correspond to the designated locations of the second images 52. When a touch operation is detected on a portion of the character image 50, the color designating section 12 designates the color of the portion of the character image 50 on which the touch operation has taken place. Specifically, when a touch operation is detected on a character within the character image 50, the color designating section 12 designates the color of the character on which the touch operation has taken place. The selection section 13 selects an image (specifically, a character) that has the same color as the designated color from the character image 50.

Figure 5:
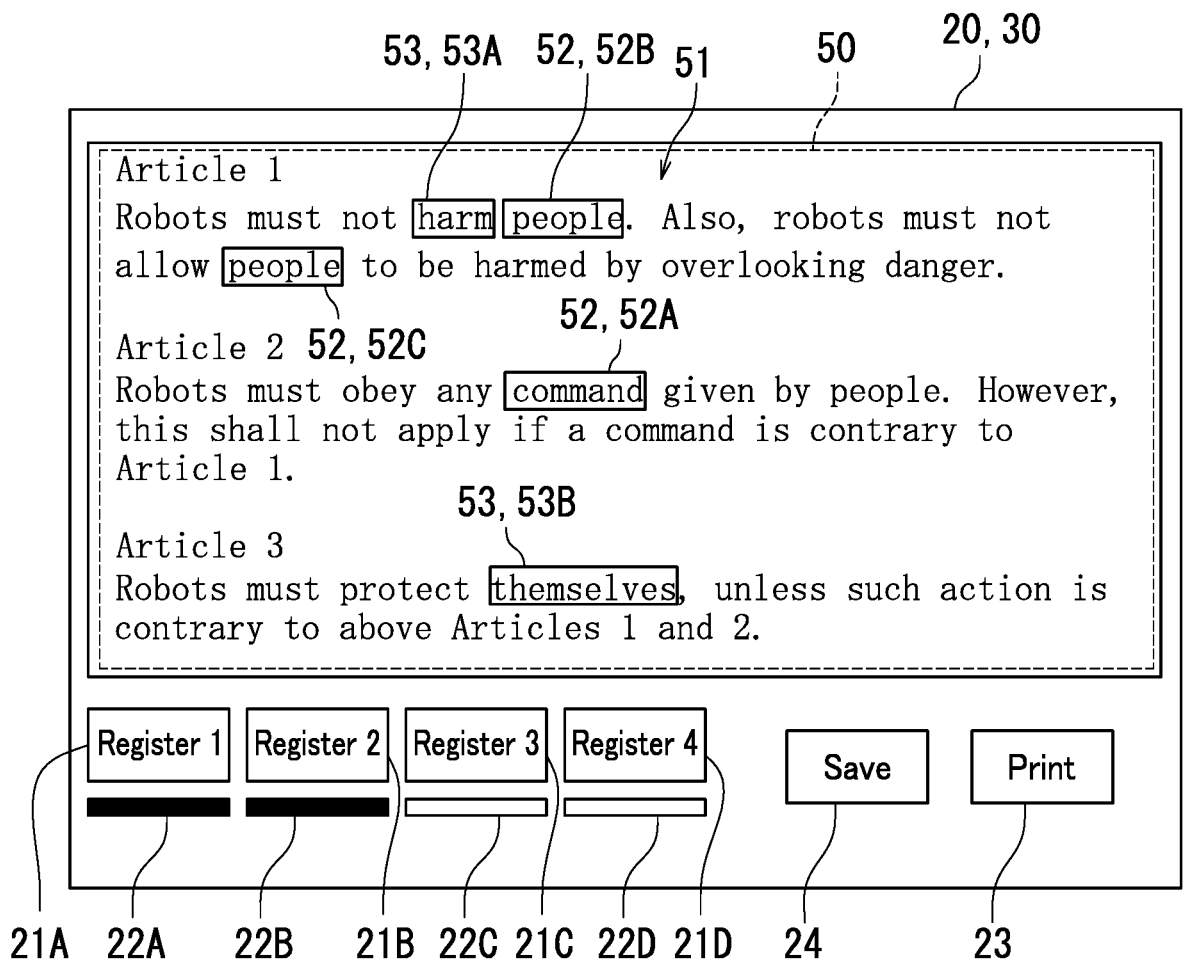
FIG. 5 is a diagram illustrating a display section from FIG. 1.

FIG. 5 illustrates the display section 20. As illustrated in FIG. 5, the display section 20 displays the character image 50. The second images 52 of the character image 50 include a second image 52A exhibiting the character string "command", a second image 52B exhibiting the character string "people", and a second image 52C also exhibiting the character string "people". The second images 52A, 52B, and 52C each have the second color. The third images 53 of the character image 50 include a third image 53A exhibiting the character string "harm" and a third image 53B exhibiting the character string "themselves". The third images 53A and 53B each have the third color.

The display section 20 also displays a first registration button 21A, a second registration button 21B, a third registration button 21C, a fourth registration button 21D, a first registered color 22A, a second registered color 22B, a third registered color 22C, a fourth registered color 22D, a print button 23, and a save button 24.

The controller 10 has a read mode and a color registration mode. The read mode is an operating mode of the controller 10 for reading the character image 50 from the document R. The color registration mode is an operating mode of the controller 10 for registering the registered colors. When the detector 30 detects a touch operation on any of the buttons from the first registration button 21A to the fourth registration button 21D, the operating mode of the controller 10 shifts from the read mode to the color registration mode. In the color registration mode, the color of an image included in the character image 50 is registered as the first registered color 22A, the second registered color 22B, the third registered color 22C, or the fourth registered color 22D.

For example, when the detector 30 detects a touch operation on the first registration button 21A, the operating mode of the controller 10 shifts to the color registration mode to register the first registered color 22A.

When the detector 30 detects a touch operation on a character included in the character image 50 in the color registration mode for registering the first registered color 22A as illustrated in FIG. 5, the color designating section 12 designates the color of the character on which the touch operation has taken place. To register the designated color as the first registered color 22A, the controller 10 directs the storage 40 to store data indicating the color of the character on which the touch operation has taken place.

For example, when the detector 30 detects a touch operation on the second image 52 (the second image 52A) exhibiting the character string "command" in the color registration mode for registering the first registered color 22A, the color designating section 12 designates the color of the second image 52A. When the color of the second image 52A (second color) is designated, the controller 10 directs the storage 40 to store data indicating the second color as data indicating the first registered color 22A. As a result, the second color is registered as the first registered color 22A. When the detector 30 detects a touch operation on the save button 24 after the first registered color 22A is registered, the controller 10 directs the storage 40 to store data indicating the second color as data indicating the first registered color 22A until a new color is registered as the first registered color 22A. Accordingly, the same color need not be registered repeatedly, and convenience for the user can increase.

When the second color is registered as the first registered color 22A, the selection section 13 selects characters with the same color as the first registered color 22A from the character image 50. In the present embodiment, because the second images 52A, 52B, and 52C have the second color, the second images 52A, 52B, and 52C are selected from the character image 50.

When the detector 30 detects a touch operation on the second registration button 21B for example, the operating mode of the controller 10 shifts from the color registration mode for registering the first registered color 22A, for example, to the color registration mode for registering the second registered color 22B.

When the detector 30 detects a touch operation on a character included in the character image 50 in the color registration mode for registering the second registered color 22B as illustrated in FIG. 5, the color designating section 12 designates the color of the character on which the touch operation has taken place. To register the designated color as the second registered color 22B, the controller 10 directs the storage 40 to store data indicating the color of the character on which the touch operation has taken place.

For example, when the detector 30 detects a touch operation on the third image 53 (third image 534) exhibiting the character string "harm" in the color registration mode for registering the second registered color 22B, the color designating section 12 designates the color of the third image 53A. When the color (third color) of the third image 534 is designated, the controller 10 directs the storage 40 to store data indicating the third color as data indicating the second registered color 22B. As a result, the third color is registered as the second registered color 22B. When the detector 30 detects a touch operation on the save button 24 after the second registered color 22B is registered, the controller 10 directs the storage 40 to store data indicating the third color as data indicating the second registered color 22B until a new color is registered as the second registered color 22B. Accordingly, the same color need not be registered repeatedly, and the convenience for the user can increase.

When the third color is registered as the second registered color 22B, the selection section 13 selects characters with the same color as the second registered color 22B from the character image 50. In the present embodiment, because the third images 53A and 53B have the third color, the third images 53A and 53B are selected from the character image 50.

When the detector 30 detects a touch operation on the print button 23 after the selection section 13 has selected characters from the character image 50, the controller 10 processes the character image 50 so as to erase the second images 52 and the third images 53 from the character image 50. The processed character image 50 is formed on the first sheet (plain paper T1, for example) by the image forming section 140 as an image exhibiting the fill-in-the-blank worksheet.

The second images 52A, 52B, and 52C are formed on the second sheet (thin paper T2, for example) by the image forming section 140 as images exhibiting answers for the fill-in-the-blank worksheet. The third images 53A and 53B are formed on the third sheet (OHP transparency T3, for example) as images exhibiting answers for the fill-in-the-blank worksheet.

Next, the fill-in-the-blank worksheet will be described with reference to FIG. 6.

Figure 6:
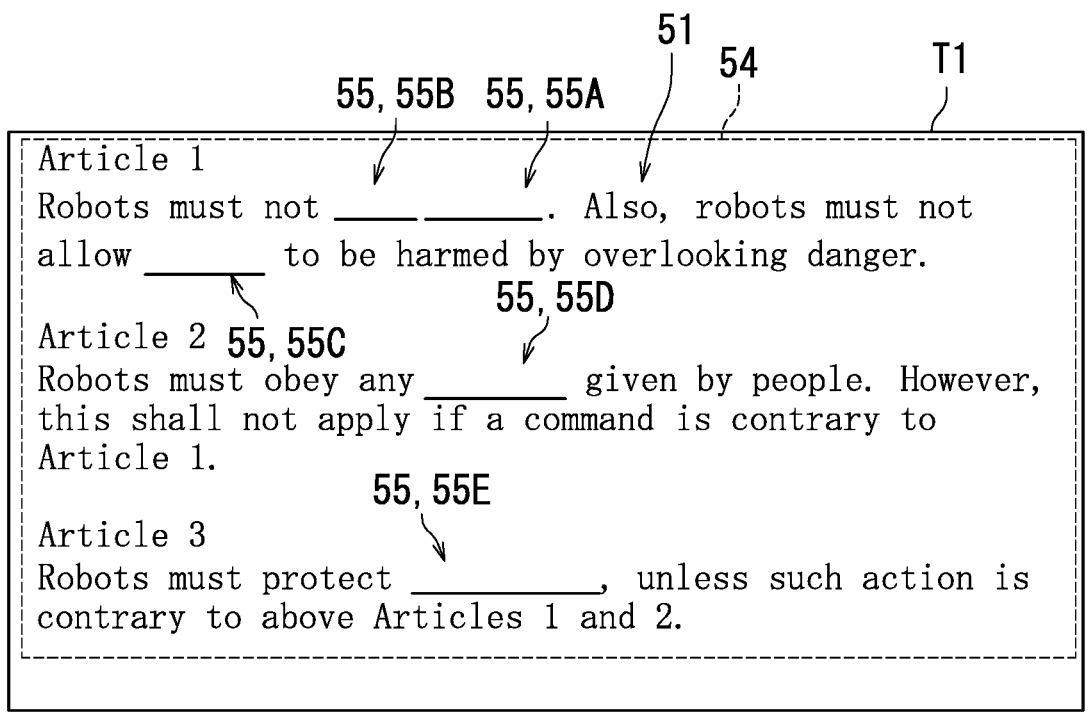
FIG. 6 is a diagram illustrating a first sheet.

FIG. 6 illustrates the plain paper T1 as the first sheet. The plain paper T1 includes a question image 54 exhibiting the fill-in-the-blank worksheet.

As illustrated in FIG. 6, the question image 54 includes the first image 51 and a plurality of marks 55.

The marks 55 are formed on the first sheet so as to correspond to the locations of the second images 52 designated by the location designating section 11. The marks 55 exhibit underlines, for example. The underlines are assigned to blank areas included in the question image 54. The blank areas are formed on the first sheet by erasing the second images 52A, 52B, and 52C from the character image 50. The locations of the blank areas on the first sheet correspond to the locations of the second images 52A, 52B, and 52C on the document R.

The marks 55 are also formed on the first sheet so as to correspond to the locations of the third images 53 designated by the location designating section 11. The marks 55 exhibit underlines, for example. The underlines are assigned to blank areas included in the question image 54. The blank areas are formed on the first sheet by erasing the third images 53A and 53B from the character image 50. The locations of the blank areas on the first sheet correspond to the locations of the third images 53A and 53B on the document R.

Specifically, a mark 55A among the marks 55 is formed on the first sheet so as to correspond to the location of the designated second image 52B. A mark 55B among the marks 55 is formed on the first sheet so as to correspond to the location of the designated third image 53A. A mark 55C among the marks 55 is formed on the first sheet so as to correspond to the location of the designated second image 52C. A mark 55D among the marks 55 is formed on the first sheet so as to correspond to the location of the designated second image 52A. A mark 55E among the marks 55 is formed on the first sheet so as to correspond to the location of the designated third image 53B.

Next, the answer keys for the fill-in-the-blank worksheet will be described with reference to FIGS. 7 and 8.

Figure 7:
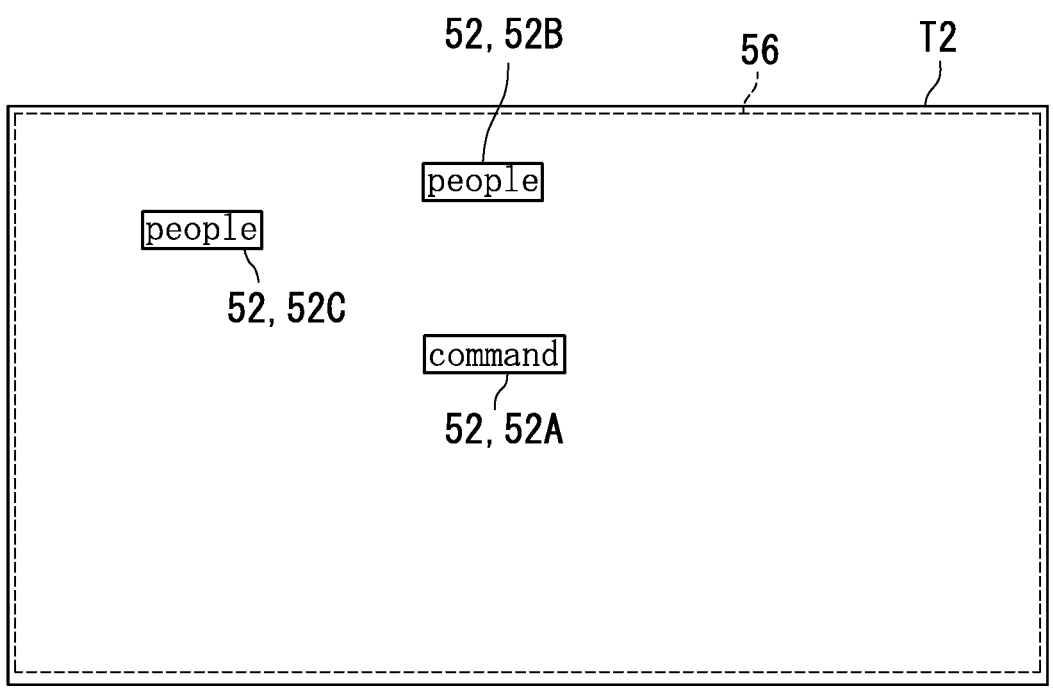
FIG. 7 is a diagram illustrating a second sheet.
Figure 8:
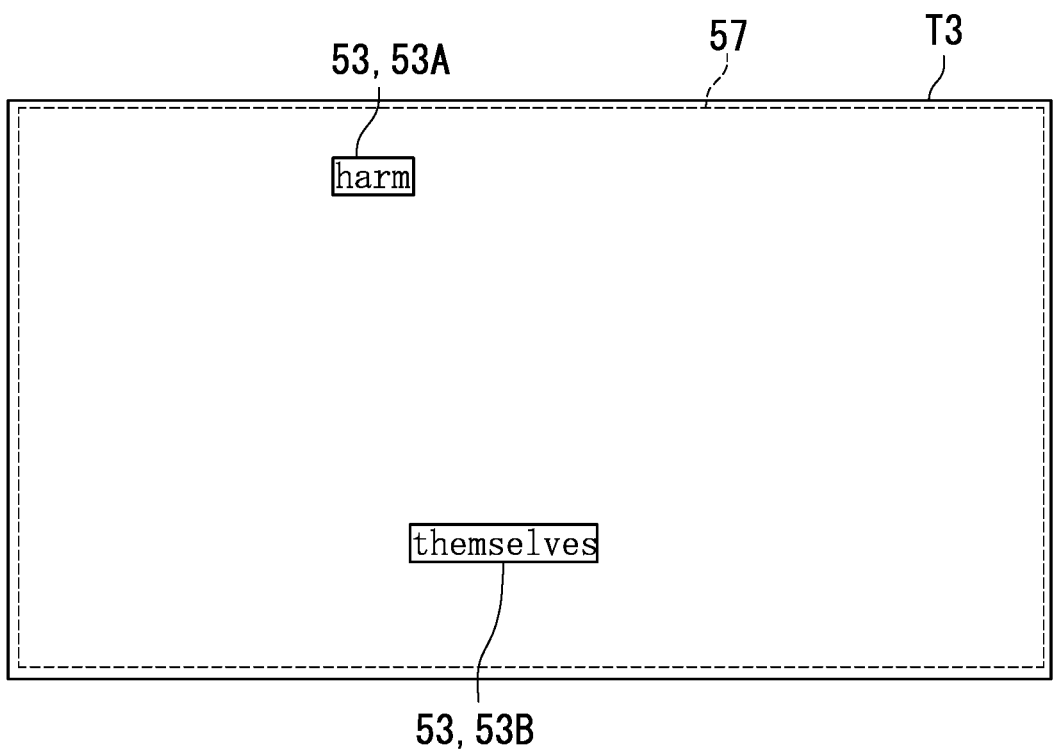
FIG. 8 is a diagram illustrating a third sheet.

FIG. 7 illustrates the thin paper T2 as the second sheet. The thin paper T2 includes a first answer image 56. The first answer image 56 includes the second images 52 (second images 52A, 52B, and 52C). The locations of the second images 52A, 52B, and 52C on the second sheet respectively correspond to the locations of the second images 52A, 52B, and 52C on the document R. Accordingly, the second sheet can be placed over the first sheet so that the second image 52A aligns with the blank area corresponding to the mark 55D, the second image 52B aligns with the blank area corresponding to the mark 55A, and the second image 52C aligns with the blank area corresponding to the mark 55C. As a result, the contents that have been memorized using the fill-in-the-blank worksheet can be easily confirmed, FIG. 8 illustrates the OHP transparency T3 as the third sheet. The OHP transparency T3 includes a second answer image 57. The second answer image 57 includes the third images 53 (third images 53A and 53B). The locations of the third images 53A and 53B on the third sheet respectively correspond to the locations of the third images 53A and 53B on the document R. Accordingly, the third sheet can be placed over the first sheet so that the third image 53A aligns with the blank area corresponding to the mark 55B and the third image 53B aligns with the blank area corresponding to the mark 55E.

According to the image forming apparatus 1 of the present embodiment as described above with reference to FIGS. 5 to 8, the locations of the second images 52 relative to the first image 51 are designated, and the marks 55 are formed on the first sheet so as to correspond to the locations of the designated second images 52. Also, the locations of the third images 53 relative to the first image 51 are designated, and the marks 55 are formed on the first sheet so as to correspond to the locations of the designated third images 53. Accordingly, the character strings erased from the character image 50 in the question image 54 can be easily recognized.

Also according to the image forming apparatus 1 of the present embodiment as described with reference to FIGS. 5 to 8, the registered colors (first registered color 22A to fourth registered color 22D) are registered by a touch operation on the display section 20. Accordingly, the colors of the character strings within the character image 50 can be set according to the degree of difficulty of memorization, and the creation of educational material for memorization of various degrees of difficulty is simplified.

Also according to the image forming apparatus 1 of the present embodiment as described with reference to FIGS. 5 to 8, when a touch operation is detected on a portion of the images, the selected second images 52 and third images 53 are respectively formed on the second sheet (thin paper T2, for example) and the third sheet (OHP transparency T3, for example). Accordingly, when the second sheet and the third sheet are fully transparent or semi-transparent, and the second sheet and the third sheet used as answer keys are placed over the first sheet used as the fill-in-the-blank worksheet, the image formed on the first sheet may not become difficult to see.

Next, the altering section 14 will be described with reference to FIGS. 7 and 8. The altering section 14 alters the color of the second images 52 to a color that differs from the second color. The image forming section 140 forms the second images 52 with a color differing from the second color on the second sheet. For example, the altering section 14 alters the color of the second images 52 to the first color. The color of the second images 52A to 52C are altered from the second color to the first color, and the second images 52A to 52C with the first color are formed in the first answer image 56 illustrated in FIG. 7.

The altering section 14 also alters the color of the third images 53 to a color that differs from the third color. The image forming section 140 forms the third images 53 with a color differing from the third color on the third sheet. For example, the altering section 14 alters the color of the third images 53 to the first color. The color of the third images 53A and 53B are altered from the third color to the first color, and the third images 53A and 53B with the first color are formed in the second answer image 57 illustrated in FIG. 8.

According to the image forming apparatus 1 of the present embodiment as described above, the color of the second images 52 can be altered to a color differing from the second color. Accordingly, for example, the second images 52 that have the first color can be formed on the second sheet by altering the color of the second images 52 to the first color. As a result, the fill-in-the-blank worksheet and corresponding answer keys can be created even when the image forming apparatus 1 does not have a color printing function.

An embodiment of the present disclosure is described above with reference to the drawings (FIGS. 1 to 8). According to the image forming apparatus 1 of the present embodiment, within the character image 50, the first image 51 is formed on the first sheet and the second images 52 are formed on the second sheet which differs from the first sheet. Thus, the character image 50 is processed so as to erase the second images 52 from the character image 50, and a processed image can be formed on the first sheet. Also, the second images 52 that serve as answers for the fill-in-the-blank worksheet are formed on the second sheet. Accordingly, the user need not perform separate jobs to create the fill-in-the-blank worksheet and corresponding answer keys.

However, the present disclosure is not limited by the above embodiment, and may be implemented in various manners within a scope not departing from the gist thereof. The drawings are schematic illustrations that emphasize elements of configuration in order to facilitate understanding thereof. Aspects of the illustrated elements of configuration such as thicknesses, lengths, and numbers may differ in practice to ease the preparation of the drawings. Also note that material properties such as shapes and dimensions described for each of the elements of configuration in the above embodiment are only examples and are not intended to impose any particular limitations on the elements, and may be altered in various manners within a scope not substantially departing from the effects of the present disclosure.

What is claimed is:

1. An image forming apparatus, comprising:
a reading section configured to read a plurality of images formed on a document;
an image forming section configured to form the images on a plurality of sheets;
a display section configured to display the images;
a detector configured to detect a first touch operation on a portion of the images;
a color designating section configured to designate a color of the portion of the images when the first touch operation is detected; and
a selection section configured to select, from the images, images that have the same color as the designated color, wherein
the images include a first image having a first color, and one or more second images having a second color differing from the first color,
the sheets include a first sheet and a second sheet, the second sheet to be used by being placed over the first sheet,
the second sheet is fully transparent or semi-transparent,
the image forming section forms the first image on the first sheet thereby forming blank areas, the blank areas corresponding to locations of the second images in the document with respect to the first image,
the image forming section forms the selected images as the second images on the second sheet such that the second images align with the blank areas when the second sheet is placed over the first sheet,
the first image exhibits a fill-in-the-blank worksheet,
the second images exhibit an answer key for the fill-in-the-blank worksheet, and
the second color is discernable when the second images are formed on the second sheet.

2. The image forming apparatus according to claim 1, wherein
the image forming section forms the selected images on the second sheet when the detector has detected the first touch operation.

3. The image forming apparatus according to claim 1, wherein
the image forming section forms the first image on the first sheet at a predetermined density or more when a density of the first image to be formed on the first sheet is less than the predetermined density.

4. The image forming apparatus according to claim 1, further comprising:
a location designating section configured to designate locations of the second images relative to the first image, wherein
the image forming section forms one or more marks on the first sheet so as to correspond to the locations of the designated second images.

5. The image forming apparatus according to claim 1, further comprising:
an altering section configured to alter the color of the second images to a color that differs from the second color, wherein
the image forming section forms the second images that have the color that differs from the second color on the second sheet.

6. The image forming apparatus according to claim 1, wherein
each of the images include one or more characters,
the detector detects a second touch operation on the characters,
the color designating section designates a color of the characters when the detector detects the second touch operation,
the selection section selects, from the images, the characters that have the same color as the designated color, and
the image forming section forms the selected characters on the second sheet as the second images.

7. The image forming apparatus according to claim 1, further comprising
a controller configured to shift an operating mode between a read mode and a color registration mode, wherein
the read mode is the operating mode of the controller for reading the images from the document,
the color registration mode is the operating mode of the controller for registering a registered color,
the registered color is a color of any image included in the images formed on the document,
the display section displays a registration button in addition to the images,
the detector detects a second touch operation on the registration button, and
the controller shifts the operating mode from the read mode to the color registration mode when the detector detects the second operation.

* * * * *